Figure 1:
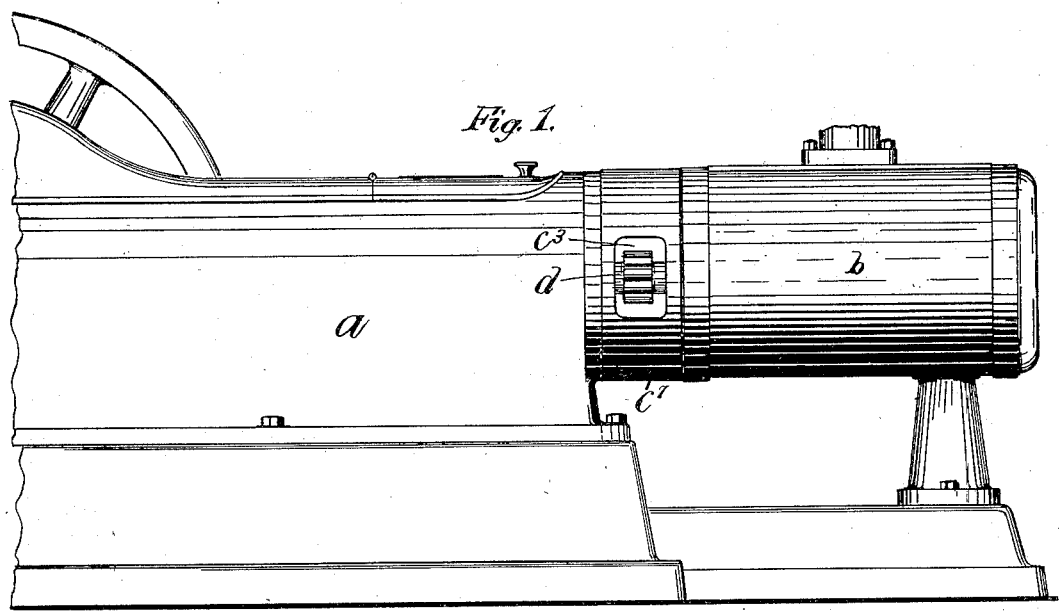

No. 696,920. Patented Apr. 8, 1902.
J. B. ALLFREE.
PISTON GUIDING AND PACKING DEVICE.
(Application filed May 24, 1899.)
(No Model.)

WITNESSES:
E. B. Hetzel
H. V. Williams

INVENTOR
James B. Allfree
BY
Ats. L. Beeton
ATTORNEY

THE NORRIS PETERS CO., PHOTO-LITHO., WASHINGTON, D. C.

UNITED STATES PATENT OFFICE.

JAMES B. ALLFREE, OF INDIANAPOLIS, INDIANA.

PISTON GUIDING AND PACKING DEVICE.

SPECIFICATION forming part of Letters Patent No. 696,920, dated April 8, 1902.

Application filed May 24, 1899. Serial No. 717,981. (No model.)

*To all whom it may concern:*

Be it known that I, JAMES B. ALLFREE, a citizen of the United States, residing at Indianapolis, in the county of Marion and State of Indiana, have invented certain new and useful Improvements in Piston Guiding and Packing Devices, of which the following specification is a full description.

The object of my invention is to provide a more lasting and effectual means for packing the piston-rod of an engine and at the same time providing a means for guiding and centering it without reliance upon the cross-head, and, further, as a means of separating the cylinder from the bed-plate for the purpose of obtaining an air-space between the cylinder and bed-plate and for protecting the piston-rod in its passage through said air-space and preventing it from cooling. I attain these objects, first, by providing a chambered cylinder-head or distance-piece having annular flanges projecting beyond its cylindrical section, through which attachment-bolts pass. In the end of said chambered cylinder-head next to the cylinder I provide a chamber for packing similar to that established by custom, and at the opposite end of said head and next to the bed I secure centrally an internally-threaded collar or nut. Fitting into said threaded collar I provide a long packing-sleeve, preferably of a rigid or stiff material and lined with bearing material, such as Babbitt metal, said sleeve having an enlarged section formed at a point between the end sections thereof and which is dentated or slotted, adapted to engagement with a spanner for the purpose of rotation of said sleeve within said nut, whereby it is longitudinally adjusted. In the inner annular surface of the lining of said sleeve I provide a number of small annular grooves and toward the end a larger groove, communicating wherewith are provided a number of small holes or ducts through the wall of said sleeve for carrying off the surplus water of condensation, which fill the small annular grooves within the packing-sleeve, and as a further means of packing, and especially as an instantly-sealing means against passage of steam before the series of grooves are filled with water of condensation, I provide a series of compressible bearing metal rings alternated with a series of non-compressible rings incased in the above-stated packing-chamber, and whereas said non-compressible rings preferably being of a larger bore than size of piston-rod the series of water-grooves is extended also through this chamber, inasmuch as the spaces between the compressible rings at the contact-point on the rod form effective grooves, said compressible and non-compressible rings being flared in opposite directions and so adapted that a pressure from said guiding-sleeve gland will cause the soft or compressible rings to close down equally and evenly around said rod. I provide also at sides of the chambered cylinder-head and through the cylindrical section thereof openings of ample size for purposes of ventilation and giving free access to operate the packing-gland, all of which will be more particularly shown and described, and pointed out in the following specification and claims.

It will be observed that by the means I employ an unusually long bearing-surface is obtained for the purpose of guiding the piston-rod, whereby I avoid the necessity of relying upon the cross-head for this purpose, and as a further result of this long sleeve, together with the small annular grooves within the interior of this sleeve, I obtain a most effectual piston-packing even without the use of any compressible packing whatever; but by the use of a section of compressible packing, whether it is metallic or otherwise, I obtain a most perfect and almost perpetual packing with the least amount of friction upon the surface of the rod, and while I obtain by this means an air-space between the cylinder and the bed I protect by the use of the sleeve the piston-rod perfectly from the effects of cold air.

Figure 2:
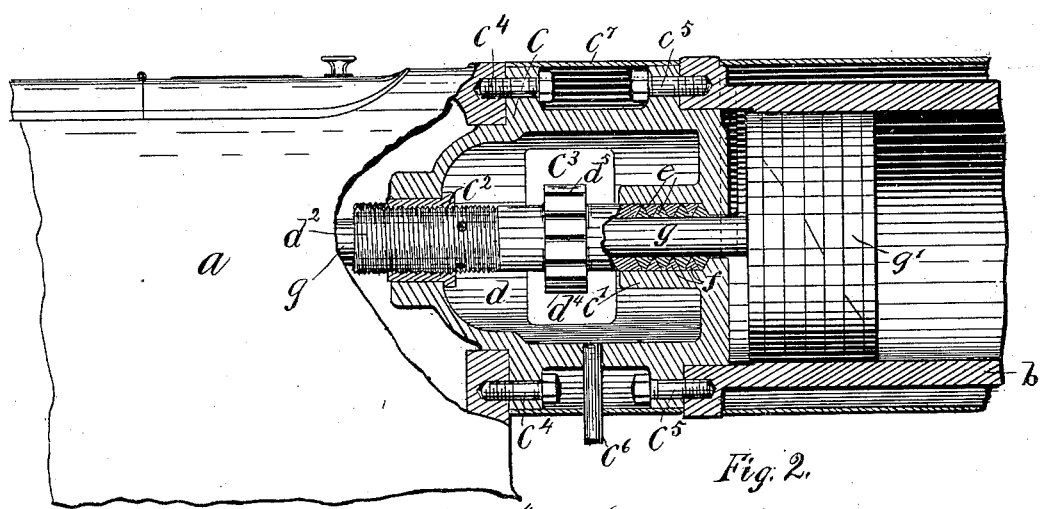
Figures 3, 4:
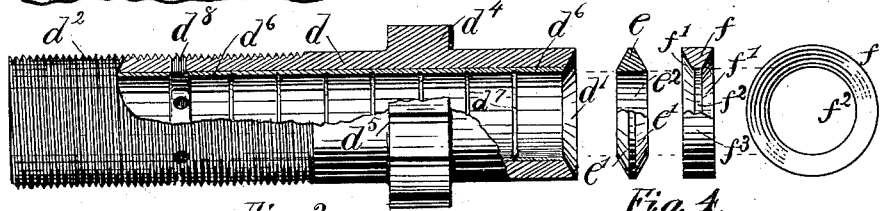

In the drawings, Figure 1 is a broken side elevation showing my device as applied to an engine. Fig. 2 is an enlarged view, partly in longitudinal section and partly in elevation. Fig. 3 is an enlarged detail view of a guiding-sleeve and packing-gland, partly in elevation and partly in section. Fig. 4 is an enlarged detail broken edge view of the compressible packing-rings $e$ and a broken edge and side view of the non-compressible rings $f$.

$a$ represents the engine-bed; $b$, the cylinder; $c$, the chambered cylinder-head or distance-piece; $c'$, the stuffing or packing chamber; $c^2$, threaded sleeve-nut; $c^3$, the openings through side walls of chambered head; $c^4$ and $c^5$, the studs or bolts by which the chambered head is secured to the engine-bed and to the cylinder, respectively.

$c^6$ is a drain-pipe by which accumulated water will be drained off.

$c^7$ is a removable outer casing surrounding the chambered head, having side openings corresponding with opening $c^3$, and is desirable for the incasing and protection of the bolts of attachment and enhancement of outward appearance.

$d$ is the elongated guiding-sleeve and packing-gland, provided at $d'$ with a beveled or flaring surface adapted to bear evenly against flaring sides $e'$ of packing-rings $e$. $d^2$ is the threaded section of said sleeve. $d^4$ is an enlarged section dentated or slotted, as at $d^5$, whereby said packing-sleeve may be rotated for adjustment by a spanner-wrench.

$d^6$ represents the soft-metal lining; $d^7$, the series of grooves.

At $d^8$ are a number of small holes or ducts communicating with the last of the series of grooves $d^7$, which is preferably larger than those nearer the cylinder, so as to readily catch all surplus water of condensation that may pass the last of the smaller grooves and discharge it through the said holes $d^8$.

$f$ represents the non-compressible metal rings, flaring toward their peripheries to accommodate their being placed in alternation and fitting with the compressible packing-rings $e$ in the packing-chamber, as seen at $e$ and $f$, Fig. 2. The inside size $e^2$ of rings $e$ have bearing on piston-rod $g$, while the inner surface $f^2$ of rings $f$ do not come in contact with the piston-rod, thus allowing a small space or groove between them, forming additional water-grooves, but should fit closely at periphery $f^3$ into the packing-chamber $c'$.

In the practice or use of my invention I do not wish to limit myself to any special or particular kind of compressible packing, whether it is metallic, hemp, rubber, or other substance, and I deem myself at liberty to make such structural changes as fall fairly within the spirit and scope of my invention; and

What I claim as new, and desire to secure by Letters Patent, is—

1. In combination with a steam-engine a chambered cylinder-head or distance-piece, a packing-chamber at one end of said chambered cylinder-head, an internally-threaded portion at the other end an externally-screw-threaded sleeve adapted to be carried in threaded portion of said cylinder-head and means whereby said sleeve may be rotated for the purpose of longitudinal adjustment, as set forth.

2. In a steam-engine the combination with a chambered cylinder-head or distance-piece, an elongated guiding and packing sleeve, a lining of suitable bearing metal within said sleeve a piston-rod adapted to reciprocate within said guiding-sleeve and bearing upon said lining of bearing metal and a number of small annular grooves in the inner bearing-surface of said lining whereby condensation or lubrication may be retained, all as set forth.

3. In a steam-engine, the combination with a chambered cylinder-head or distance-piece, openings in the sides of the walls thereof for purposes of admitting a circulation of air and access for attendant radial flanges projecting from its cylindrical portion for purposes of its attachment to bed-plate at one end and that of the cylinder thereto at the other end, a packing-chamber at the cylinder end of said head and means for the adjustment of packing within said packing-chamber, as set forth.

4. In a steam-engine the combination with a long relative guiding and packing sleeve, a concave or inwardly-flaring end surface at inner end of said sleeve, a series of compressible packing-rings reversely flared and equally on both sides being beveled outwardly toward the periphery, a series of non-compressible rings flared, or beveled toward the center like said sleeve being preferably of larger bore than piston-rod to be packed, latter said rings being placed in packing-chamber in alternative with said compressible packing-rings, and means whereby said guiding and packing sleeve may be caused to impinge upon or against the combined body of said rings, as shown.

5. In a steam-engine the combination with a long sleeve having its outer end externally threaded and its internal surface filled with small grooves and its walls perforated; of a compressible packing adapted to be compressed by said sleeve.

6. In a steam-engine the combination with a chambered cylinder-head, or distance-piece, an elongated packing-sleeve lined with a bearing metal, and a number of small annular grooves in inner surface thereof, as set forth.

In testimony whereof I have subscribed my name.

JAMES B. ALLFREE.

Witnesses:
   A. L. TEETOR,
   E. B. HETZEL.